United States Patent
Hansmann et al.

(10) Patent No.: US 6,451,086 B2
(45) Date of Patent: Sep. 17, 2002

(54) PROCESS FOR THERMAL TREATMENT OF RESIDUAL MATERIALS CONTAINING HEAVY METAL AND IRON OXIDE

(75) Inventors: Thomas Hansmann, Trier (DE); Romain Frieden, Beidweiler; Marc Solvi, Ehlange s/Mess, both of (LU)

(73) Assignee: Paul Wurth S.A., Luxembourg (LU)

( * ) Notice: Subject to any disclaimer, the term of this patent is extended or adjusted under 35 U.S.C. 154(b) by 0 days.

(21) Appl. No.: 09/780,449

(22) Filed: Feb. 12, 2001

Related U.S. Application Data

(63) Continuation of application No. PCT/EP99/05456, filed on Jul. 30, 1999.

(30) Foreign Application Priority Data

Aug. 11, 1998 (LU) ................................................ 90273

(51) Int. Cl.$^7$ .............................................. C21B 13/08
(52) U.S. Cl. ............................ 75/483; 75/658; 75/694; 75/961; 266/145; 266/177
(58) Field of Search ................................ 266/145, 181, 266/173, 178, 177; 75/483, 961, 694, 658; 423/97, 107, 108

(56) References Cited

U.S. PATENT DOCUMENTS

| | | |
|---|---|---|
| 2,389,199 A | 11/1945 | Brassert et al. |
| 3,756,804 A | 9/1973 | Stevenson |
| 3,850,613 A | 11/1974 | Allen |
| 4,261,268 A | 4/1981 | von Dreusche, Jr. et al. |
| 4,369,059 A | * 1/1983 | Elsenheimer ............... 266/173 |

FOREIGN PATENT DOCUMENTS

| | | |
|---|---|---|
| DE | 552837 | 6/1932 |
| DE | 1225673 | 9/1966 |
| EP | 46146 | 2/1982 |
| FR | 913032 | 8/1946 |
| FR | 1128520 | 1/1957 |
| FR | 2 373 612 | 7/1978 |
| GB | 2043112 | 10/1980 |
| LU | 87890 | 11/1992 |

* cited by examiner

*Primary Examiner*—Melvyn Andrews
(74) *Attorney, Agent, or Firm*—Oblon, Spivak, McClelland, Maier & Neustadt, P.C.

(57) ABSTRACT

A process for thermal treatment of residual materials containing heavy metal and iron oxide, including providing a multiple-hearth furnace having hearths provided one above the other, depositing the residual materials continuously on a top hearth of the hearths, gradually transferring the residual materials to lower hearths of the hearths, introducing reducing agents to at least one of the hearths and reacting the residual materials to form heavy metals and directly reduced iron, exhausting gases containing heavy metals from below hearths of the hearths where the heavy metals are being vaporised, re-injecting at least a part of the gases into the multiple-hearth furnace from above the hearths of the hearths where the heavy metals are being vaporised, and discharging the directly reduced iron together with residues of the reducing agents in an area of a bottom hearth of the hearths in the multiple hearth furnace.

22 Claims, 1 Drawing Sheet

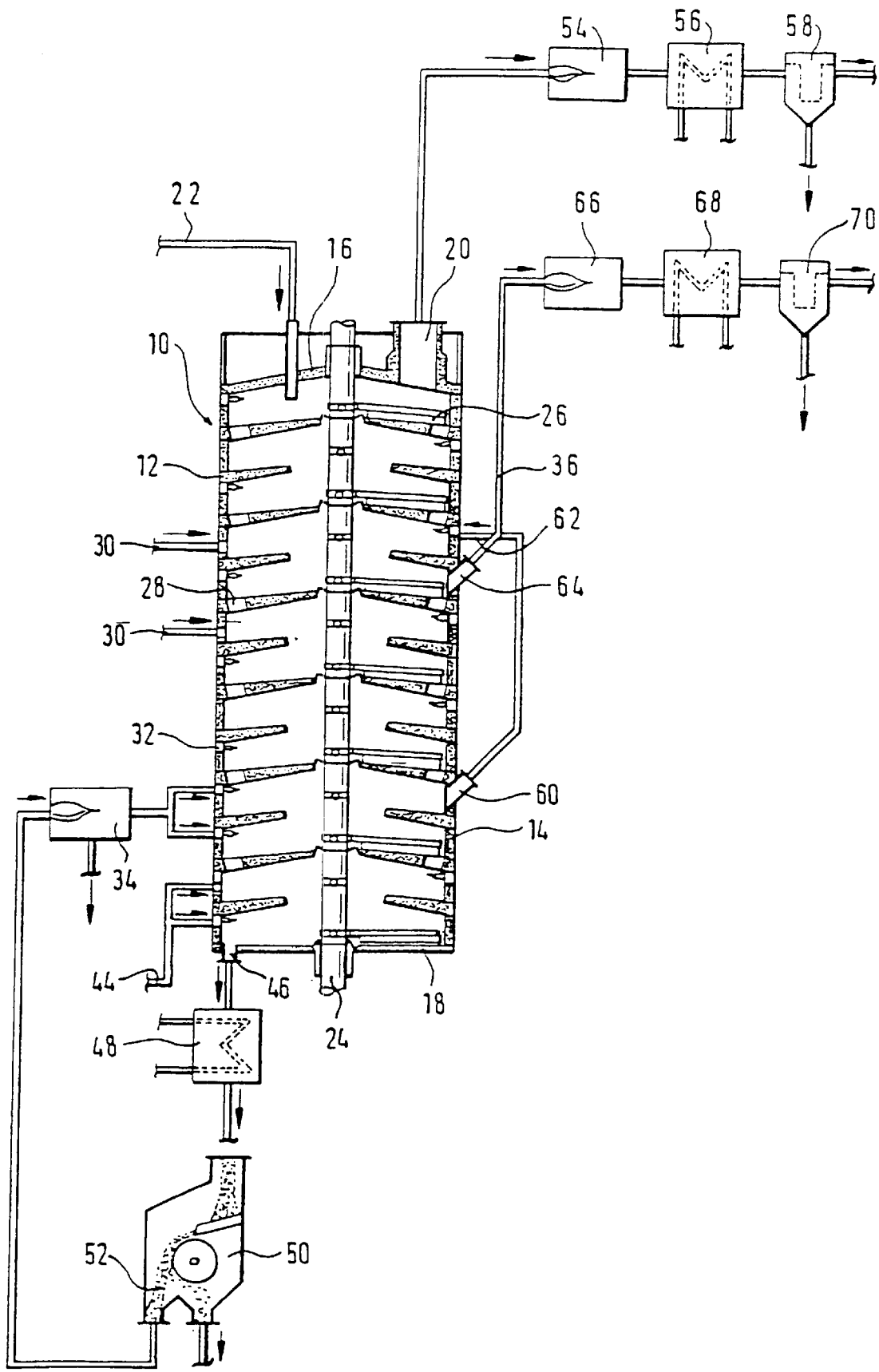

PROCESS FOR THERMAL TREATMENT OF RESIDUAL MATERIALS CONTAINING HEAVY METAL AND IRON OXIDE

CROSS-REFERENCE TO RELATED APPLICATIONS

The present application claims priority under 35 U.S.C. §119 to Luxembourgian Patent Application No. 90 273, filed Aug. 11, 1998. Further, the present application is a continuation of and claims priority under 35 U.S.C. §120 to International Application No. PCT/EP99/05456, filed Jul. 30, 1999 which was published in English. The contents of these applications are incorporated herein by reference in their entirety.

BACKGROUND OF THE INVENTION

1. Field of the Invention

The invention relates to a process for thermal treatment of residual materials containing heavy metal and iron oxide.

2. Discussion of the Background

Large quantities of residual materials containing heavy metal and iron oxide in the form of dust or sludge are produced in the electric or converter steel mills. Residual materials are separated by waste gas cleaning plants from the waste gas as dust or sludge. The disposal of this residual material is expensive or the final storage of these materials is problematic. The sludges are generally stored in artificial lakes in the open, whereas the dusts are stored underground in tunnels.

Typical compositions of dusts and sludges containing heavy metal from electric or converter steel mills are shown in the following table.

TABLE 1

|  | Fe (%) | Zn (%) | Pb (%) | C (%) | $H_2O$ (%) |
| --- | --- | --- | --- | --- | --- |
| Dusts | 20–30 | 20–35 | 1–10 | 1–2 | — |
| Sludges | 20–30 | 2–8 | 1–5 | — | 30–40 |

U.S. Pat. No. 3,756,804 describes a process for the thermal treatment of waste gas dusts containing heavy metal and iron oxides in a multiple-hearth furnace incorporating several hearths one above the other. The waste gas dusts containing heavy metal and iron oxides are mixed with reduction agents, conveyed to the uppermost hearth of the multiple-hearth furnace and gradually transferred to the lower hearths. The reduction agent reacts with the waste gas dusts containing heavy metal and iron oxides so as to form heavy metals and directly reduced iron, the heavy metals being vaporised. A by-pass duct located in the furnace wall at the level of the topmost intermediate hearth conveys the gases to a condenser cooler, where the temperature of the gases is lowered so that the heavy metals condense and are deposited on plates in the condenser cooler. The gases released to a considerable extent from the vaporised heavy metals are subsequently heated and then introduced into the lower part of the furnace.

SUMMARY OF THE INVENTION

According to one aspect of the present invention, a process for thermal treatment of residual materials containing heavy metal and iron oxide, includes providing a multiple-hearth furnace having a plurality of hearths provided one above the other, depositing the residual materials containing heavy metal and iron oxide continuously on a top hearth of the plurality of hearths, gradually transferring the residual materials containing heavy metal and iron oxide to lower hearths of the plurality of hearths, introducing reducing agents to at least one of the plurality of hearths and reacting the residual materials containing heavy metal and iron oxide to form heavy metals and directly reduced iron, exhausting gases containing heavy metals from below hearths of the plurality of hearths where the heavy metals are being vaporised, re-injecting at least a part of the gases into the multiple-hearth furnace from above the hearths of the plurality of hearths where the heavy metals are being vaporised, and discharging the directly reduced iron together with residues of the reducing agents in an area of a bottom hearth of the plurality of hearths in the multiple hearth furnace.

According to another aspect of the present invention, a multiple-hearth furnace for thermal treatment of residual materials containing heavy metal and iron oxide, includes a plurality of hearths provided one above the other inside the multiple-hearth furnace, a depositing device for depositing the residual materials containing heavy metal and iron oxide continuously on a top hearth of the plurality of hearths, a transferring device for gradually transferring the residual materials containing heavy metal and iron oxide to lower hearths of the plurality of hearths, an introducing device for introducing reducing agents to at least one of the plurality of hearths and reacting the residual materials containing heavy metal and iron oxide to form heavy metals and directly reduced iron, an exhausting device for exhausting gases containing heavy metals from below hearths of the plurality of hearths where the heavy metals are being vaporised, a re-injecting means for re-injecting at least a part of the gases into the multiple-hearth furnace from above the hearths of the plurality of hearths where the heavy metals are being vaporised, and a discharging device for discharging the directly reduced iron together with residues of the reducing agents in an area of a bottom hearth of the plurality of hearths in the multiple hearth furnace.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross sectional view of a multiple-hearth furnace for thermal treatment of residual materials containing heavy metal and iron oxide according to one embodiment of the present invention.

DESCRIPTION OF THE PREFERRED EMBODIMENTS

The preferred embodiments will now be described with reference to the accompanying drawings, wherein like reference numerals designate corresponding or identical elements throughout the various drawings.

FIG. 1 shows a cross-sectional view of a multiple-hearth furnace 10 with several—in this case twelve—hearths 12 one above the other according to one embodiment of the present application. These self-supporting hearths 12 as well as a casing 14, a cover 16 and a bottom 18 of the furnace 10 are made from refractory material.

An outlet 20, through which gases are evacuated from the furnace 10, and an opening 22 through which residual materials containing heavy metal and iron oxide are discharged on the top hearth, are provided in the cover 16 of the furnace 10.

A shaft 24, on which rakes 26 extending over the respective hearths are secured, is mounted in the centre of the furnace 10.

The rakes 26 are designed in such a way that they move the material on one hearth outwards from the inside and then inwards from the outside on the underlying hearth in order to convey the material downwards from the top in the furnace 10.

Residual materials containing heavy metal and iron oxide and reducing agents are also introduced separately into the furnace 10. The residual materials are discharged on the first hearth in this case, whereas the reducing agents are fed to one of the underlying hearths and brought into contact there with the residual materials containing heavy metal and iron oxide.

The residual materials containing heavy metal and iron oxide as well as the reducing agents are heated to about 600° C. to 1000° C. during the transport.

The shaft 24 and rakes 26 are air-cooled and openings, through which the air flows into the interior of the furnace 10 and be used there for after-combustion, are provided on the rakes 26.

At least one inlet opening 30, through which reducing agents are introduced into the furnace 10, is provided in the sidewalls of the furnace 10—normally in the upper third. These reducing agents may be present both in gaseous form and also in liquid or solid form. The reducing agents are, for example, carbon monoxide, hydrogen, natural gas, petroleum and petroleum derivatives or solid carbon carriers such as lignite coke, petroleum coke, blast furnace dust, coal or the like.

The reducing agent, in this case coal, is also introduced to a hearth further below in the furnace 10, is mixed there by the rakes 26 with the heated residual materials containing heavy metal and iron oxide. The iron oxide present in the residual materials containing oil and iron oxide is gradually reduced by the high temperature in the presence of carbon monoxide to metallic iron during transport through the multiple-hearth furnace 10.

The controlled feed of solid, liquid and gaseous reducing agents and gases containing oxygen at various points of the multiple-hearth furnace 10 and the possibility of exhausting excess gases at critical points permit accurate control of the reduction of the residual materials containing heavy metal and iron oxide and realisation of the process under optimum conditions.

The furnace allows a portion of the gases flowing upwards in the furnace 10 to be exhausted from the furnace 10 through an exhaust connection piece 60 in the side wall below the hearths, on which the heavy metals evaporate, and re-injected into the furnace 10 through an inlet 62 above these hearths.

Consequently, the gas quantity present on the hearths, on which the heavy metals evaporate, is small. They are then exhausted from the furnace 10 in a relatively small gas quantity on this hearth through an outlet 64 in the sidewall. The small volume of gas with relatively high heavy metal content is then cleaned separately. As a result of the small waste gas quantities, the gas flow rates on the corresponding hearths are low and only small amounts of dust are thus discharged with this waste gas. Consequently, an extremely high heavy metal concentration results in the waste gas.

The waste gases are subsequently oxidised in an after-combustion chamber 66, the heavy metals being converted to heavy metal oxides and separated from the waste gases in a filter 70. Before the waste gases enter the filter 70, they are cooled down to the required temperature in a cooler 68.

Nozzles 30 for injection of hot (350° C. to 500° C.) gases containing oxygen, through which air or another gas containing oxygen is fed into the furnace 10, are provided in the side wall. As a result of the high temperatures and the presence of oxygen, part of the carbon burns to carbon dioxide, which in turn reacts with the carbon present in excess and is converted to carbon monoxide. The carbon monoxide finally reduces the oxides.

As this reaction is predominantly endothermal, in the lower part of the furnace 10 burners 32, which ensure a uniform high temperature in the bottom hearths of the furnace are installed. Gas or pulverised coal burners are used in this case.

These burners 32 are fired with gas or pulverised coal with air for preheating and/or additional heating. An additional reduction gas is produced by the quantitative ratio between oxygen and combustion material or in the case of excess air after-combustion of the process gases is achieved. In the case of pulverised coal firing excess carbon monoxide may be produced in the burner. In the case of outer combustion chambers the ash of the burnt coal is prevented from entering the furnace 10 and mixing with the iron. The temperatures in the combustion chambers are selected in such a way that the slag produced is tapped in liquid form and disposed of in vitrified form. The consumption of solid carbon carriers in the furnace 10 and thus also the ash content in the finished product are reduced by production of carbon monoxide.

Feed of a gaseous reducing agent, e.g. carbon monoxide or hydrogen, through special nozzles 44 is provided in the last or last two hearths. Reduction of the iron oxides is completed in this atmosphere with increased reduction potential.

The iron produced is subsequently discharged through the outlet 46 in the bottom 18 of the furnace 10 together with the ash.

The iron discharged at the outlet 46 is cooled with the ash and any reducing agents, which are further used, in a cooler 48. The reduced iron is subsequently separated via a magnetic separator 50 from the ash of the reducing agents and any reducing agents, which are further used.

Reducing agents 52, which are further used, are then burnt in an external combustion chamber 34. The gases produced by combustion of the reducing agents are introduced into the furnace 10, whereas the residues of the reducing agents are removed as ash or liquid slag via an outlet.

The gas mixture from the furnace 10 passes through the outlet 20 into an after-burner 54, where the combustible gases of the gas mixture are burnt. The gas mixture is subsequently introduced into a cooler 56 supplied with a cooling medium and cooled. The cooled gas mixture is subsequently cleaned with the aid of a cyclone filter 58 before it is removed to the atmosphere.

One advantage according to the invention is that the metal oxides present as mixture is reduced and separated (in particular iron and zinc), so that the separated fractions constitute feed materials for other processes or is returned to the existing production lines of the steel mills. By-products are thus obtained from important constituents of the residual materials. The iron content is returned to the production operations of the steel mill after passing through the process. Heavy metal oxides are concentrated to such an extent that they are used as raw material for recovery of heavy metals. Ash consisting essentially of inert materials such as $SiO_2$, $Al_2O_3$, $MgO$, . . . and possibly an excess of reducing agents may remain.

As soon as the reducing agents have been fed into the furnace, they are mixed by the rakes under the residual materials containing heavy metal and iron oxide and heated. As soon as they have reached a certain temperature (about 900° C.), they begin to react with the heavy metal oxides, whereby heavy metals form and evaporate and are discharged together with the waste gases from the multiple-hearth furnace.

According to the present process, part of the gases which flow upwards in the furnace below the hearths on which heavy metals vaporise is exhausted from the furnace, e.g. through an exhaust connection in the side wall, and re-injected into the furnace above these hearths, e.g. through an inlet. In this way, the quantity of gas present on the hearths on which the heavy metal oxides are reduced to heavy metals and are vaporised is kept small. The heavy metals are then exhausted from the furnace through an outlet in the side wall in a relatively small quantity of gas on these hearths. The exhausted gas mixture is after-burned, cooled in a cooling device and then cleaned with the aid of a filter before being discharged to the outside.

Due to the reduced quantities of waste gas, low gas flow rates occur on the corresponding hearths and so little dust is discharged with this waste gas. In this way, a very high concentration of heavy metals in the waste gas is produced.

The heavy metals are advantageously exhausted on the hearths where they are formed and treated separately from the other waste gases.

The waste gases are subsequently oxidised, e.g. in an after-combustion chamber, the heavy metals being converted to heavy metal oxides, which are then separated from the waste gases in filter equipment.

At the same time or later, the iron oxides remaining in the multiple-hearth furnace are reduced to metallic iron. The metallic iron produced in this way is discharged from the furnace together with the residues of the material introduced, the ashes of the reducing agents and any excess of reducing agents.

In this process, dust or sludge-type residual materials containing heavy metal and iron oxide is fed, agglomeration of the particles being avoided by selective process control and continuous circulation. The process supplies a fine-grained end product regardless of the consistency of the feed material.

This is advantageous, if ash-forming reducing agents are used. As the solid end product is fine-grained, the ash is easily separated from the iron. This separation takes place, for example, in the hot condition by screening.

After cooling below 700° C., it is possible, on the other hand, to separate the reduced iron via magnetic separators from the ash and excess reducing agent. The quality of the directly reduced iron obtained in this way is virtually independent of the quantity of the residues of the reducing agent.

The iron obtained is subsequently processed into briquettes or introduced directly into a melting furnace (electric furnace, etc.) and further processed.

The reducing agent residues produced are utilised with any unused reducing agents in a separate gasification reactor, the ash-forming constituents being advantageously separated as liquid slag and the crude gas formed used in the multiple-hearth furnace as combustion or reducing gas.

Accordingly it is also possible to use a cheaper reducing agent with a relatively high ash content and/or work with a relatively high excess of reducing agent, which prevents agglomeration of the residual materials.

When working with excess reducing agents, it is possible to process the residues in order to separate and reuse the unused reducing agents. This is done, for example, by screening the residues, if the unused reducing agents are present in sufficiently coarse form. The unused reducing agents are returned directly to the multiple-hearth furnace.

However, the charging of reducing agent is also distributed to several stages.

It is thus possible that coarse-grained reducing agents (1-3 mm) are introduced at higher levels in the multiple-hearth furnace and fine-grained reducing agents (<1 mm) further below. Consequently, discharge of dust with the waste gases is largely avoided and the reaction accelerated by the fine reducing agent particles introduced further below.

Consumption of reducing agents is reduced by the charging of coarser particles, because the small particles are quickly consumed by reaction with $H_2O$ and $CO_2$ from the waste gas in the upper hearths, on which an oxidising atmosphere prevails.

The process space is subdivided into different zones, the solids move continuously downwards from the top and the gases are conducted upwards from the bottom through the furnace. By subdividing the process space into different zones, the process conditions in the different zones or even for each hearth is measured and selectively influenced.

However, the residual materials containing heavy metal and iron oxide is also mixed with at least one part of the required reducing agents before they are introduced into the multiple-hearth furnace. This applies in particular in the case of treatment of sludges, which are mixed with at least one part of the required reducing agents, before they are introduced into the furnace. The sludges usually have a tacky consistency and is introduced more easily into the furnace, if they are mixed with the reducing agents. The mixing with the reducing agents prevents the fed material forming agglomerates during heating.

By selective feeding of reducing agents in the lower furnace hearths, the reduction gases in the furnace is adjusted to an optimum concentration and a higher degree of metallisation thus achieved.

The residual materials containing heavy metal and iron oxide are circulated continuously by rakes mounted on each furnace hearth and conveyed gradually to the underlying hearth.

Agglomeration of the particles is prevented by the continuous circulation. The rate of circulation depends on many factors such as the geometry of the rakes, the thickness of the layers, etc. The residual materials containing heavy metal and iron oxide, any reducing agent present and the directly reduced iron on the hearths is circulated at least once every one to three minutes with the result that agglomeration is largely prevented.

Gases containing oxygen is injected on the hearth, where the heat requirement is covered by combustion of the excess process gases.

It is advantageous to use gases containing oxygen with a temperature of at least 250° C.

A gaseous reducing agent is additionally injected on the lowest hearths of the multiple-hearth furnace. This ensures a higher reduction potential of the atmosphere in the furnace and more complete reduction of the oxides is achieved.

According to a further advantageous embodiment one or more furnace hearths, which are below the hearth, on to which reducing agents are introduced, are heated by burners.

In order not to reduce the concentration of reduction gases in the lower part of the furnace by flue gases of the heating system, energy is also fed indirectly here, i.e. by radiation heating.

According to another preferred embodiment, gases are exhausted from the multiple-hearth furnace at one or more hearths. These hot gases are subsequently passed through a $CO_2$ scrubber to reduce the gas quantity and increase the reduction potential of the gas or through an additional reactor, in which carbon is present, so that the carbon dioxide present in the hot gases reacts with the carbon to form carbon monoxide according to Boudouard equilibrium and the reduction potential of the gas is thus increased. The gases enriched with carbon monoxide are subsequently returned to the multiple-hearth furnace.

The multiple-hearth furnace is operated under a specific overpressure to achieve a further increase in productivity. In contrast to a rotary furnace, which is sealed via water seals with a diameter of about 50 m, this is achieved in a multiple-hearth furnace, which has only small seals on the drive shaft. In such a case pressure locks for the feed and removal of material must be provided.

According to another aspect of the present invention, a multiple-hearth furnace for thermal treatment of residual materials containing heavy metal and iron oxide may be sued to treat dusts and sludges from electric or converter steel mills according to the process described.

Obviously, numerous modifications and variations of the present invention are possible in light of the above teachings. It is therefore to be understood that within the scope of the appended, the invention may be practised otherwise than as specifically described herein.

What is claimed as new and desired to be secured by Letters Patent of the Unisted States is:

1. A process for thermal treatment of residual materials containing heavy metal and iron oxide, comprising the steps of:
   providing a multiple-hearth furnace having a plurality of hearths provided one above the other;
   depositing the residual materials containing heavy metal and iron oxide continuously on a top hearth of the plurality of hearths;
   gradually transferring the residual materials containing heavy metal and iron oxide to lower hearths of the plurality of hearths;
   introducing reducing agents to at least one of the plurality of hearths and reacting the residual materials containing heavy metal and iron oxide to form heavy metals and directly reduced iron;
   exhausting gases containing heavy metals from below hearths of the plurality of hearths where the heavy metals are being vaporised;
   re-injecting at least a part of the gases into the multiple-hearth furnace from above the hearths of the plurality of hearths where the heavy metals are being vaporised; and
   discharging the directly reduced iron together with residues of the reducing agents in an area of a bottom hearth of the plurality of hearths in the multiple hearth furnace.

2. The process according to claim 1, further comprising processing the gases in an after-burner, wherein the heavy metals are converted to heavy metal oxides and separated from the gases in a filter.

3. The process according to claim 1, wherein the gases are re-injected onto one of the plurality of hearths positioned below the at least one hearth of the plurality of hearths to which the reducing agents are introduced.

4. The process according to claim 1, further comprising the steps of:
   cooling the directly reduced iron to below 700° C. after being discharged from the multiple-hearth furnace; and
   separating the directly reduced iron from the residues of the reducing agents by a magnetic separator.

5. The process according to claim 1, further comprising separating the directly reduced iron from the residues of the reducing agents in a hot state by screening after being discharged from the multiple-hearth furnace.

6. The process according to claim 4, further comprising processing the directly reduced iron into at least one of pellets and briquettes.

7. The process according to claim 1, further comprising melting the directly reduced iron with or without the residues of the reducing agents.

8. The process according to claim 4, further comprising separating any unused reducing agents from the residues of the reducing agents after being discharged from the multiple-hearth furnace.

9. The process according to claim 8, wherein the residues of the reducing agents are used in a gasification reactor, ash-forming constituents being separated as liquid slag, crude gas formed being used in the multiple-hearth furnace and resulting heat being fed to the multiple-hearth furnace.

10. The process according to claim 1, wherein the reducing agents are introduced in at least one of liquid, solid and gaseous form into the multiple-hearth furnace.

11. The process according to claim 1, wherein the reducing agents are introduced to different hearths of the plurality of hearths in the multiple-hearth furnace.

12. The process according to claim 11, wherein:
   the reducing agents comprise coarse-grained reducing agents and fine-grained reducing agents; and
   the coarse-grained reducing agents are introduced into the multiple-hearth furnace at higher level and the fine-grained reducing agents are introduced into the multiple-hearth furnace below the higher level.

13. The process according to claim 1, further comprising introducing an excess reducing agent into the multiple-hearth furnace.

14. The process according to claim 1, wherein the residual materials containing heavy metal and iron oxide and at least a part of the reducing agents are mixed before being introduced into the multiple-hearth furnace.

15. The process according to claim 1, further comprising injecting gases containing oxygen selectively to different hearths of the plurality of hearths.

16. The process according to claim 15, wherein the gases containing oxygen have a temperature of at least 250° C.

17. The process according to claim 1, further comprising injecting gaseous reducing agents into a bottom hearth of the plurality of the hearths in the multiple-hearth furnace.

18. The process according to claim 1, wherein at least one of the plurality of hearths are heated directly or indirectly.

19. The process according to claim 1, the gases containing heavy metals are exhausted from the multiple-hearth furnace at at least one of the plurality of hearths.

20. The process according to claim 19, wherein the reduction potential of the exhausted gases is increased and the gases are subsequently introduced into the multiple-hearth furnace.

21. The process according to claim 1, wherein the process is carried out under overpressure.

22. A multiple-hearth furnace for thermal treatment of residual materials containing heavy metal and iron oxide, comprising:
   a plurality of hearths provided one above the other inside the multiple-hearth furnace;

depositing means for depositing the residual materials containing heavy metal and iron oxide continuously on a top hearth of the plurality of hearths;

transferring means for gradually transferring the residual materials containing heavy metal and iron oxide to lower hearths of the plurality of hearths;

introducing means for introducing reducing agents to at least one of the plurality of hearths and reacting the residual materials containing heavy metal and iron oxide to form heavy metals and directly reduced iron;

exhausting means for exhausting gases containing heavy metals from below hearths of the plurality of hearths where the heavy metals are being vaporised;

re-injecting means for re-injecting at least a part of the gases into the multiple-hearth furnace from above the hearths of the plurality of hearths where the heavy metals are being vaporised; and discharging means for discharging the directly reduced iron together with residues of the reducing agents in an area of a bottom hearth of the plurality of hearths in the multiple hearth furnace.

\* \* \* \* \*